United States Patent Office 3,738,864
Patented June 12, 1973

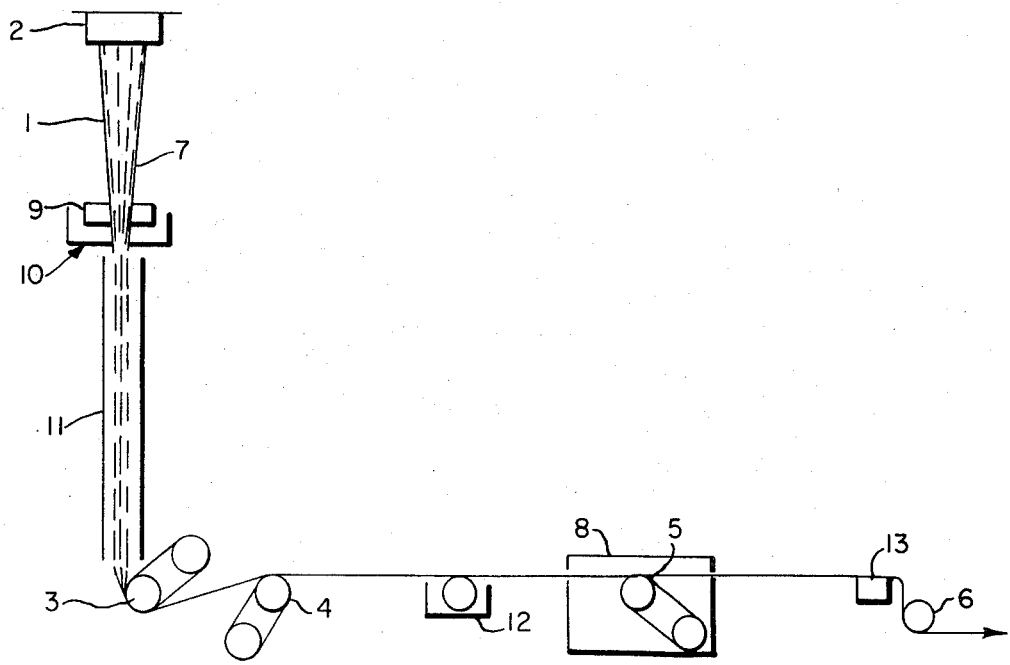

3,738,864
FIBER BEARING ANTISTATIC COMPOSITION
Karl Altau, Waynesboro, Va., assignor to E. I. du Pont de Nemours and Company, Wilmington, Del.
Filed Apr. 26, 1971, Ser. No. 137,515
Int. Cl. B32b 27/02; C09j 3/16
U.S. Cl. 117—138.8 F     13 Claims

ABSTRACT OF THE DISCLOSURE

Polyamide or polyester fiber bearing the reaction product of a polyoxypropylene diamine and a polyepoxide substantially free from ethyleneoxy groups provides a durable antistatic agent which attracts brighteners during washing but does not attract dirt typically retained in dry cleaning solvents during dry cleaning.

This invention is concerned with a polyamide or polyester textile fiber bearing an antistatic finish. It is particularly concerned with such a fiber having antistatic properties which are durable to washing or dry cleaning.

BACKGROUND OF THE INVENTION

Polyamide and polyester synthetic fibers are normally highly hydrophobic, and garments made from these fibers tend to develop and hold charges of static electricity. Consequently, the garments cling to the body or to other objects and also attract lint.

Accordingly, surface finishes and additives have been developed to reduce these less desirable features of polyamide and polyester fibers.

For example, Anthes in U.S. Pat. 2,982,751 discloses the use of polyoxyethylene amines and polyepoxides to obtain durable antistatic finishes.

Numerous other finishes have also been developed in an attempt to provide durable antistatic finishes. A finish suitable for one synthetic organic fiber in a given end use may have certain side effects making it less desirable for use with another fiber in another end use.

The present invention provides an improved polyamide or polyester fiber bearing a durable antistatic finish which is resistant to the staining which occurs due to attraction of soil from dry cleaning solvents during dry cleaning. The treated fiber generally has the additional feature of attracting optical brighteners from detergent solutions containing them, during washing.

This invention is a polyamide or polyester fiber bearing the reaction product of a polyoxypropylene diamine and a polyepoxide substantially free from ethyleneoxy groups, said polyoxypropylene diamine having the formula:

$$H_2N—A—[O—R]_n—O—A'—NH_2$$

where A and A' are each independently selected from the group consisting of lower alkylene, R is

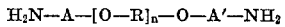

and $n$ is between about 10 and 50.

Preferably the amine has a molecular weight of between about 1000 and 3000, and most preferably the molecular weight of the amine is between about 1000 and 2000.

The polyepoxide preferably contains at least 2 epoxide groups per molecule to minimize the quantity of epoxide reagent used and preferably the ratio of epoxy groups in the polyepoxide to the amine groups in the polyamine is between about 1 and 6, and most preferably between 2 and 4.

In one embodiment the epoxide is prepared by the reaction of glycerine and epichlorohydrin.

In one embodiment the fiber consists essentially of repeating units derived from the reaction between bis(p-aminocyclohexyl)methane and dodecanedioic acid. This fiber is often utilized in applications wherein the advantages of the invention are most meaningfully realized. The polyamide fibers may be treated and retain the coating in the form of a yarn or fabric.

Definitions

"Fiber" as used herein includes short lengths such as "staple fibers" and also continuous filaments.

"Multiplicity of fibers" as used herein to describe the fibers in yarn or fabric form includes in its scope said polyamide or polyester fibers together with fibers of other composition. As the examples show, the amine and epoxide may be applied to the fiber in filament, yarn or fabric form.

"Polyamide" as used herein means those polymers containing recurring units of the formula:

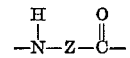

wherein Z is a member of the class consisting of a divalent hydrocarbon radical and a divalent radical of the formula:

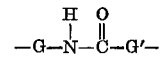

wherein G and G' are divalent hydrocarbon radicals which may contain substituents as known in the art to enhance dyeability, flame retardance, improve heat or light stability and the like. This term encompasses copolyamides, terpolyamides and the like. Typical polyamides and processes for their production are described in U.S. Pat. Nos. 2,071,250; 2,071,253 and 2,130,948 and U.S. Pat. No. 3,393,210.

Polyesters as used herein means fiber-forming linear condensation polymers containing in the polymer chain the carbonyloxy linnking radicals

Polymers containing oxycarbonyloxy radicals are comprehended within this group and a reference to the term "polyester" encompasses copolyesters, terpolyesters and the like. The polyesters or polyamides may, if desired, contain additives, e.g., delustrants, viscosity boosters, pigments and the like.

Examples of linear condensation polyesters are polyethylene terephthalate, polyethylene terephthalate/isophthalate (85/15), polyethylene terephthalate/hexahydroterephthalate (90/10), polyethylene terephthalate/5-(sodium sulfo)isophthalate (97/3), poly(p-hexahydroxylylene terephthalate), poly(diphenylolpropane isophthalate), the polyethylene naphthalene dicarboxylates (especially those derived from the 2,6- and 2,7-isomers) and poly-(hexamethylene bibenzoate. Polyethylene terephthalate and terephthalate copolyesters, in which at least 85 molpercent of the dibasic acid units are terephthalate units are preferred polyesters.

"Lower alkylene" as used herein means an alkylene group having between 1 and 8 carbon atoms.

The fiber of this invention bears a composition which imparts certain properties. By "bearing" is meant that the composition is primarily or totally on the surface of the fiber as would be expected from application of a fiber finish as contrasted to the random distribution of material across the cross-section of a fiber when the material is added to a fiber melt before spinning.

THE INVENTION IN MORE DETAIL

The polypropyloxy diamines useful in this invention are substantially free of ethyleneoxy units and may be prepared according to teachings of Belgian 554,506 and 560,446 using the appropriate propylene containing precursor and such diamines are commercially available as disclosed hereinafter. Minor impurities may be present as a result of various methods of preparation but as above discussed ethyleneoxy units should be avoided.

The amines are reacted with an epoxide substantially free of ethyleneoxy units to form a cured composition. The epoxide should be substantially free of ethyleneoxy units in order to avoid the previously mentioned problem of soil pickup in dry cleaning. Thus, epoxides and amines free of ethyleneoxy units are desired. However, epoxides with up to about 15% by weight ethyleneoxy units are within the scope of this invention.

The polyepoxides useful in forming the antistatic composition of this invention may be glycidyl ethers of a polyol, diglycidyl ethers of bisphenol A or F (and their homologs), glycidyl ethers of tetrakis (hydroxyphenol) ethane, or epoxylated novolak resins. They are typically prepared by condensing epichlorhydrin with a polyol.

A typical example is the condensation product (with elimination of HCl) of glycerine and epichlorohydrin. Preparation of these products is described in detail in British Pat. 780,288, dated July 31, 1957. Such a material with a molecular weight of between about 280 and 360 is available under the trademark "Eponite 100" (viscosity 90–150 cp. at 25° C.; 10.2 lbs./gal.) from the Shell Chemical Corp. of 500 Fifth Avenue, New York, N.Y. Other similar commercial products from the same source include the "Epon" resins which are diepoxide condensation products of epichlorhydrin and dimethyl, di-parahydroxyphenyl methane. The poly(allylglycidyl ethers) may be used. Also suitable are pentaerethritol diepoxide, the condensation product of tetramethylolmethane and epichlorhydrin. It may sometimes be desirable to employ a polyepoxide which in itself contains propyleneoxy units, such as the condensation product of a polypropylene glycol and epichlorhydrin. The presence of ethyleneoxy units should be avoided, as previously explained.

Eponite® 100 is preferred and contains about 2.2 epoxy groups/molecule and is as represented by Formula I. Approximately 80% of this composition is represented by E as hydrogen, and about 20% by E as

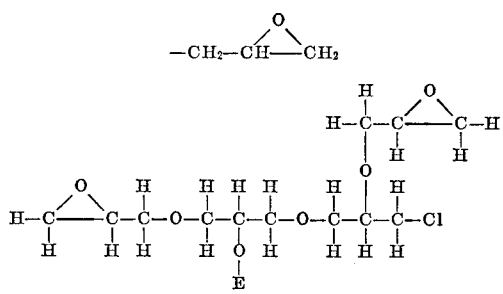

The diamines useful in this invention may be applied to the fiber from a water dispersion. The useful epoxides have a lower water dispersability and thus the amine and epoxide may be applied serially from different bath or may be applied as an emulsion of a mixture of the polyepoxide and the polyamine. Generally the emulsion is prepared by dispersing the polyamine and the polyepoxide in water at room temperature with vigorous stirring. The concentration of reactants in the emulsion may vary widely. A concentration as high as 20% may be used. However, more dilute emulsions containing from about 1 to about 5% of reactants are generally preferred. Any such finishing composition having a concentration suitable to provide from about a 0.1% to about a 5% solids pickup based on the dry material is satisfactory.

Reaction of the polyamine with the polyepoxide may be conveniently accomplished by heating the shaped structure to which the mixture of the amine and polyepoxide has been applied, although the composition will also cure at room temperature over a period of days.

The antistatic composition may be applied to the fiber at any stage of manufacture, from the solidified undrawn filament to the final garment. Application to the filament in unfabricated form such as at the time of spinning or drawing is preferred.

The durable antistatic coating of the invention requires that there be provided enough of the polyoxypropylene diamine on the surface of the fiber to produce the desired antistatic effect; preferably, this will be about 0.9–1.1%, based on weight of fiber. The amount of the polyepoxide used in conjunction therewith is such as to react with the diamine, and will, of course, vary to some extent with the molecular weight of the epoxide, its epoxy equivalent, and the method of application. Preferably, the weight ratio of polyamine: polyepoxide is maintained within the limits of 10:3 to 10:7. Higher amounts of polyepoxide may be employed especially when applying the composition on the spinning machine when the reagents are applied separately. Low ratios of epoxide/amine tend to reduce wash fastness of the finish.

Curing can conveniently be accomplished by heating the fiber with the mixture of amine and epoxide to 115 to 205° C. for periods of ½ to 5 minutes (the lower temperatures requiring the longer times).

The fiber may be treated before or after dyeing or other finishing sequences not enumerated herein but typical in the textile industry, but preferably after bleaching.

In order to assist in wetting the fiber completely, and as an aid in emulsifying the reagents, a wetting agent, preferably non-ionic, is often employed. A suitable agent is Neutronyx® 600, sold by the Onyx Chemical Corporation; this compound is an alkyl phenol polyglycol ether containing 9.5 moles of ethylene oxide per alkyl phenol radical. The amount of such additive should be kept to a minimum since it, too, may react with the epoxide, thereby decreasing the available amount of that reagent.

After the reactants have been applied in appropriate amount, the fiber article is heated to bring about reaction of the epoxide groups to form cross-linked polymer on the surface of the fiber.

The amine and epoxide useful in the present invention may be applied to fabric by padding, dipping, spraying or the like, as well as to skeins of yarns, staple, tow or top. One method of application is directly during the spinning of the fiber such as before the fibers are drawn and indeed in a continuous process immediately on solidification of the fiber before the threadline contacts other apparatus. This method of application is shown schematically in the figure, in which filaments 1 are extruded from spinneret 2, through quench zone 7 in which they solidify and are contacted with a mixture of amine and epoxide useful in this invention by contact with rotating ceramic roll 9. Roll 9 dips in a pan 10 containing an emulsion of the antistatic composition. After picking up the required amount of the composition, the polyamine-polyepoxide composition may be partially cured in heated tube 11 prior to first stage drawing. Feed roll 3 forwards the filaments to first stage draw roll 4, which runs at a higher peripheral speed than roll 3. Heated enclosure 8 surrounds second stage draw rolls 5 which, in turn, run at a higher peripheral speed than 4. The filaments then travel to a conventional windup 6. In processing, additional other finish such as lubricant may be applied if desired by contact with finish roll 12, prior to additional curing in the heated enclosure 8 and further additional other finish for packaging purposes may be applied to the dried partially cured filaments at finish roll 13, if desired. Alternatively, it may often be desirable to apply the antistatic composition instead of or in addition to the finish at 12, or finish at 13. In yet another embodiment, the diamine component may be applied at 9 or 12, and the diepoxide at 13.

The concentration of agent on the fiber to give satisfactory antistatic effect will vary somewhat from fiber to fiber. Usually a concentration of 0.1 to 5.0% by weight is satisfactory. For most applications 0.5 to 2.0% is adequate.

Measurements

The static propensity of the fabric is determined by measuring the static charge decay rate using the Vykand Static Propensity Tester manufactured by the Vykand Corporation. In this equipment the fabric is used to form one plate of a capacitor and the static detector is used as the other plate. A negative charge of 5000 volts is placed upon the fabric, then the sample is grounded and the time required for leakage to 2500 volts is measured, under controlled humidity conditions. This is referred to as the half-life of the static charge. A half-life of 90 seconds is considered just barely satisfactory.

Alternatively, the static propensity of a fabric may be reported in terms of direct current resistivity, termed "Log R," because the numbers reported represent the logarithm to the base 10 of the resistance in ohms per square, under given relative humidity conditions. The standard test method is described in AATCC-76, 138–139, (1959).

Dry cleaning soil pickup for fabrics is measured with a Differential Colormaster Colorimeter (Model No. 4, Manufacturers Engineering Equipment Corp., Hatboro, Pa.).

Green, red and blue light reflectances are measured for the test fabrics. From these values, the difference of the cube roots of the reflectances, (sample minus standard), $\Delta(G^{1/3})$, $\Delta(R^{1/3})$, $\Delta(B^{1/3})$ are calculated, and from these, in turn, the Adams color coordinates are calculated according to the following relationships:

$\Delta L = 25.29\Delta(G^{1/3}) - 18.38$
$\Delta a = 106[\Delta(R_1^{1/3}) - \Delta(G^{1/3})]$, where $R_1 = 0.8R + 0.2B$
$\Delta b = 42.34[\Delta(G^{1/3}) - \Delta(B^{1/3})]$
$\Delta E = [(\Delta L)^2 + (\Delta a)^2 + (\Delta b)^2]^{1/2}$ $\Delta E$ is used as a measure of color difference before and after commercial dry cleaning.

Optical brightener pick-up for fabrics is measured by a Hunter Laboratory D-40 Reflectometer. The difference in measured whiteness, $\Delta W$, observed with and without ultraviolet contribution is due to ultraviolet-induced fluorescence and can be taken as a measure of brightener pick-up. $W_{inc}$ is the reflectance value with ultraviolet contribution. $W_{exc}$ is the reflectance value without ultraviolet contribution.

The following examples will illustrate the invention. All parts and percentages are expressed on a weight basis unless otherwise indicated.

EXAMPLE 1

A mixed shrinkage 65 denier 36 filament yarn is prepared so that half of the filaments consist essentially of the polyamide from bis(4-aminocyclohexyl)methane of 70% trans-trans stereoisomer content and dodecanedioic acid (termed PACM-12 hereinafter). The other half of the filaments consist essentially of a copolymer which is 99% PACM-12 and 10% (by weight) of the reaction product of bis(p-aminocyclohexyl)methane and isophthalic acid. Suitable spinning and drawing procedures for this yarn are described in Example 1 of U.S. 3,416,302. The yarn is woven into a twill fabric, which is then scoured, dried and heat set.

The following solutions A, B and C are prepared as follows.

Solution A

The polyamine used is a polyoxypropylene diamine [Jeffamine® D-1000 (hereinafter termed "D-1000"), sold by the Jefferson Chemical Company, Houston, Tex.] conforming to Formula I wherein A and A' are

—CH(CH$_3$)CH$_2$— and $n$ has an average value of 14.9.

This is well-dispersed to form an aqueous emulsion of 20% "D-1000," 5% "Neutronyx" 600 with 75% distilled water. To 66.6 g. of this mixture, 6.6 g. "Eponite" 100, 2.2 g. "Neutronyx" 600 and 925 ml. cold water are added with good stirring. The clear mixture is transferred to a 10 x 16 in. shallow pan for padding.

Solution B

A similar solution is made, differing only in that the "D-1000" is replaced by a like weight of "Polyetherdiamine L-1000" (hereinafter termed L-1000), a product of Union Carbide Corporation, Moorestown, N.J. This diamine conforms to the formula of the polyoxypropylene diamine wherein A is —(CH$_2$)$_3$— and A' is

—CH$_2$CH(CH$_3$)(CH$_2$)$_3$— and $n$ has an average value of 14.

Solution C

For comparison purposes polyoxyethylene diamine [Aston® 123, produced by the Onyx Oil and Chemical Company, 115 Norris St., Jersey City, N.J. is used. This product has the formula:

$$HN-\left[(CH_2CH_2O)_x-CH_2CH_2N-\right]_y-(CH_2CH_2O)_z-CH_2CH_2Cl$$
$$\phantom{HN-[}CH_3\phantom{(CH_2CH_2O)_x-CH_2CH_2N-}CH_3$$

and is used as a 20% solution or dispersion in water. The product is described by W. L. Ginilewicz in Modern Textiles, 41, 50–56 (July 1960).

This polyamine solution in amount of 66.6 g. is added to the quantities of "Eponite" 100, "Neutronyx" 600 and water used for solution A, described above.

Next 9 x 15 in. swatches of the test fabric are immersed flat in each of the above baths for 10–15 min. The wetted fabric is then passed through a small wringer. The solid pickup is controlled by adjusting the roll pressure. The solid pickup is checked by weighing the fabric before and after finish application.

The padded fabric is fastened flat between spring-supported clips attached to a frame; the fabric is air dried for 10–15 minutes and is then cured in a forced-air oven at 160° C. for 3 minutes. Prior to testing, the padded fabric is left in air at room temperature for at least 48 hours to secure complete curing.

The fabric swatches are (a) given 5 conventional dry cleanings (b) given 10 "C" washes and (c) given 5 dry cleanings followed by 2 "C" washes. The dry cleanings are carried out by sending the samples to a commercial dry cleaning establishment where they are all cleaned under commercial conditions in the same solvent which had been in use commercially in that establishment at that time and contained the same level of "dirt" in the solvent as that in use at that time (the dry cleaning mixture is "Adco" dry cleaning soap and perchloroethylene TM solvent). All samples are dry cleaned simultaneously. The fabrics are then dried; group (a) are tested for soil pick-up, and (b) and (c) are tested for static propensity. The results are listed in Table 1; an untreated control is also included.

TABLE 1

| Treating solution | Percent by weight of antistat based on weight of fiber | $\Delta E$ color after (a) | Log R | | | | | |
|---|---|---|---|---|---|---|---|---|
| | | | Initial | | After (b) | | After (c) | |
| | | | 26% [1] | 55% [1] | 26% [1] | 55% [1] | 26% [1] | 55% [1] |
| A | 2 | 5.1 | 11.8 | 11.1 | 13.8 | 12.1 | 12.8 | 12.0 |
| B | 2 | 1.2 | 12.0 | 11.2 | 13.2 | 12.0 | 13.0 | 11.8 |
| C | 2 | 17.4 | 10.1 | 9.1 | 12.7 | 11.1 | 12.4 | 10.9 |
| None (Control) | 0 | 3.2 | >15 | >15 | >15 | >15 | >15 | >15 |

[1] RH.

EXAMPLE 2

A 10 filament mixed-shrinkage yarn of 30 (total) denier and 5 filaments of each one of the compositions described in Example 1 is produced, using the apparatus of the figure. Spinning and drawing conditions are substantially as described and referenced in Example 1. The yarn is wound at a speed of about 2600 yd./min. with reference to FIG. 1. Container 10, in which rotating finish roll 9 is partially immersed, contains solution A of Example 1, having about 6% of solids in water. This solution is cooled to about 20° C. to prevent premature reaction. The amount of solution picked up by the filaments is adjusted to give about 2% by weight based on weight of fibers of solids (after drying), by adjusting the rate at which roll 9 turns.

After contact with the solution, the undrawn filaments are converged to a bundle, and partially cured while passing through tube 11, which is heated by steam at 160–170° C. The tube is about 4 feet long and about 1½ in. in inside diameter. The yarn remains in the tube about 0.04 second.

The composition is additionally cured in enclosure 8, which is maintained at 165° C. Filament residence time in this enclosure is about 0.2 second. A control yarn is also prepared in similar fashion without antistat composition in pan 10.

Each of the yarns produced as described above are knitted into jersey fabrics by the same techniques and each of the fabrics is heat set at about 190° C. for 1 minute, scoured and similarly dyed. Each is then tested for static propensity at two levels of relative humidity, at room temperature, before and after washing, with the results shown in Table 2. In a second test samples of each of the fabrics are subjected to the dyeing procedure, but without dye, and are evaluated for soil pickup after 5 commercial dry cleanings, as in Example 1. Results are shown in Table 2.

TABLE 2

| | Fabric Log R | | | | ΔE (5 dry) clean |
|---|---|---|---|---|---|
| | Initial | | After 10 "C" wash | | |
| | 26%[1] | 55%[1] | 26%[1] | 55%[1] | |
| Test | 12.2 | 11.4 | 13.0 | 15.5 | 4.31 |
| Control | 14.8 | 15.0 | 14.8 | >15.5 | 4.35 |

[1] RH.

EXAMPLE 3

Swatches of white (undyed) twill fabrics prepared from the yarns as described in Example 1 are padded with antistat solutions of components as described below and dried. The coatings are cured for 15 minutes at 130° C. Samples prepared with the components set forth below (a) are subjected to the charge decay static test (30% R.H.) and others are (b) dry cleaned 5 times in a commercial dry cleaning establishment. The amount of antistatic agent is given as percent, based on fabric weight. The results are listed in Tables 3 and 4.

Cotton, which is generally acceptable with respect to static propensity, has a charge decay time of 20 seconds.

TABLE 4

Stain appearance, after 5 commercial dry cleanings as in Example 1

| Sample | Appearance |
|---|---|
| 1 | Not stained. |
| 2 | Not stained. |
| 3 | Badly stained. |
| 4 | Not stained. |
| 5 | Not stained. |

EXAMPLE 4

A mixed-shrinkage yarn of 65 (total) denier and 36 filaments is produced in accord with the teachings of Example 2; the yarn contains equal numbers of filaments of the polymer compositions used for the two components of Example 2; finish compositions D, E and F are applied to portions of the spun yarn by the process described with relation to the figure, using the same finish roll 9 speed as before, so that the solids pickup is about 2% for D and E.

Finish compositions D, E and F are prepared as follows:

Finish D

Seventy-five g. of L–1000 is vigorously blended with 37.5 g. "Eponite" 100, 12.5 g. "Neutronyx" 600 and 2600 ml. distilled water.

Finish E

Three hundred seventy-five g. of a solution containing 20% (by weight) of "Aston" 123 in water is vigorously blended with 37.5 g. "Eponite" 100, 12.5 g. "Neutronyx" 600 and 2600 ml. of distilled water.

Finish F

Distilled water (control).—1 x 1 plain weave fabrics are prepared from twisted yarns bearing one of the three finishes. The fabrics are each scoured and heat set for 1 minute at 190° C. Swatches of fabric containing items D, E and F are subjected to 10 "C" washes and 5 commercial dry cleanings as in Example 1, followed by testing for log R and whiteness (ΔE), with the results listed in Table 5.

TABLE 5

| | Fabric Log R | | | | ΔE color (After 5 dry cleanings) |
|---|---|---|---|---|---|
| | Initial | | After 10 "C" wash | | |
| Item | 26%[1] | 55%[1] | 26%[1] | 55%[1] | |
| D | 12.5 | 12.1 | 13.7 | 13.0 | 1.1 |
| E | 10.7 | 9.9 | 11.7 | 10.8 | 19.0 |
| F (control) | >15.5 | >15.5 | >15.5 | >15.5 | 3.2 |

[1] RH.

EXAMPLE 6

Following the procedure of Example 1, a swatch of knitted heat-set fabric of polyhexamethylene adipamide (66 nylon) filaments is scoured, heat-set at 196° C. for 40 seconds, and soaked for 10 minutes (room temperature) in solution A of Example 1. The fabric is removed and passed through a wringer. After drying, the fabric shows a solids pickup of 3.3% by weight. The fabric is then cured by heating for 40 seconds at 196° C.

TABLE 3.—ANTISTATIC ACTIVITY

| Sample No. | Diamine D | Polyepoxide P | Ratio of solids P/D percent | Appln. medium | Charge decay sec. |
|---|---|---|---|---|---|
| 1 | L–1000 | "Eponite" 100 | 1/0.5 | Water | 4 |
| 2 | L–1000 | do | 1/0.5 | Acetone | 3 |
| 3 | "Aston" 123 | do | 0.67/0.33 | Water | 1 |
| 4 | L–1000 | X–100[1] | 1/0.5 | do | 18 |
| 5 | Control—no finish | | | | (²) |

[1] X–100 is pentaerythritol-di-epoxide.
² Not antistatic.

A control fabric of 66 nylon is prepared which is heat-set, scoured and heat-set as above without any soaking in solution A.

Test and control fabrics are tested for log R before and after 5 "C" washes, and for whiteness ($\Delta E$) before and after 5 "C" washes followed by 5 commercial dry cleanings and two "C" washes, with the results shown in Table 6. The $\Delta E$ value gives the change in whiteness compared to the whiteness of the original, untreated control.

TABLE 6.—ANTISTATIC TREATMENT OF 66 NYLON

| Item | Percent antistat | Log R (26% RH) | | $\Delta E$—After 5 dry clean + 2 "C" wash |
|---|---|---|---|---|
| | | Initial | After 5 "C" wash | |
| Test | 3.3 | 11.8 | 12.7 | 2.1 |
| Control | None | 54.9 | 54.1 | 2.0 |

The test is repeated, using two swatches of knitted polyethylene terephthalate fabric. One swatch of fabric is heat-set at 196° C. for 40 seconds and soaked for 10 minutes (room temperature) in solution A of Example 1. The fabric is removed and passed through a wringer. After drying, the fabric shows a solids pickup of 1.3% by weight. The fabric is then cured by heating for 40 seconds at 196° C.

A control fabric of polyethylene terephthalate is prepared which is heat-set, scoured and heat-set as above without any soaking in solution A. The results listed in Table 7 are obtained.

TABLE 7.—ANTISTATIC TREATMENT OF POLYETHYLENE TEREPHTHALATE

| Item | Percent antistat | Log R (26% RH) | | $\Delta E$—After 5 dry clean + 2 "C" wash |
|---|---|---|---|---|
| | | Initial | After 5 "C" wash | |
| Test | 1.3 | 11.5 | 13.2 | 2.4 |
| Control | None | 15.0 | 15.0 | 1.0 |

Since some of the ingredients used in preparing the fibers of this invention are toxic, e.g., the diamines and the epoxides, they should be handled with care. After curing them on the fiber surface, however, one cured product appears to be relatively nontoxic and thus no special precautions in handling the fibers of this invention are necessary.

What is claimed is:

1. A polyamide or polyester fiber which bears the reaction product of a polyoxypropylene diamine and a polyepoxide, both substantially free from ethyleneoxy groups, in the weight ratio of between about 10:3 to about 10:7 diamine:polyepoxide, said product being present in an amount between about 0.1% to about 5% based on the total weight of the fiber, said polyoxypropylene diamine having the formula:

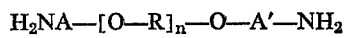

where A and A' are each lower alkylene, R is

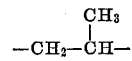

and $n$ is between 10 and 50, said polyepoxide containing at least 2 epoxide groups per molecule and being selected from glycidyl ethers of a polyol, diglycidyl ethers of a bisphenol, glycidyl ethers of tetrakis(hydroxyphenyl) ethane or epoxylated novalak resins.

2. The fiber of claim 1 wherein the amine has a molecular weight of between about 1000 and 3000.

3. The product of claim 2 wherein the molecular weight of the amine is between 1000–2000.

4. The fiber of claim 1 wherein the ratio of epoxy groups in the polyepoxide to the amine groups in the polyamine is between about 1 and 6.

5. The fiber of claim 4 wherein the ratio of epoxy groups in the polyepoxide to amine groups in the amine is between two and four.

6. The fiber of claim 5 wherein the epoxide is prepared by the reaction of glycerine and epichlorhydrin.

7. A multiplicity of fibers of claim 1 in the form of a yarn.

8. The multiplicity of fibers of claim 7 in the form of a fabric.

9. The fiber of claim 1 wherein the reaction product is present on the fiber in an amount of 0.5–2% by weight of the fiber.

10. Polyamide fiber of claim 1.

11. The fiber of claim 10 wherein the polyamide comprises repeating units derived from the reaction between bis(p-aminocyclohexyl)methane and dodecanedioic acid.

12. A multiplicity of fibers of claim 3 in the form of a yarn.

13. The multiplicity of fibers of claim 12 in the form of a fabric.

References Cited

UNITED STATES PATENTS

| | | | |
|---|---|---|---|
| 2,982,751 | 5/1961 | Anthes | 260—29.2 |
| 3,459,697 | 8/1969 | Goldberg et al. | 117—138.8 X |
| 3,236,685 | 2/1966 | Caldwell et al. | 117—138.8 |
| 3,351,622 | 11/1967 | Tesoro | 260—78 |
| 3,376,245 | 4/1968 | Sample et al. | 252—8.8 X |
| 3,446,734 | 5/1969 | Coats | 252—8.8 |

WILLIAM D. MARTIN, Primary Examiner

S. L. CHILDS, Assistant Examiner

U.S. Cl. X.R.

117—138.8 N, 139.5 CQ; 252—8.8